March 5, 1957  S. COLEMAN ET AL  2,784,245
STORAGE BATTERY SUPPORTS

Filed Dec. 27, 1955  2 Sheets-Sheet 1

INVENTORS
Sidney Coleman &
Augustine L. Colarusso
BY
Sigmund Herzog
Attorney

March 5, 1957  S. COLEMAN ET AL  2,784,245
STORAGE BATTERY SUPPORTS
Filed Dec. 27, 1955  2 Sheets-Sheet 2

INVENTORS
Sidney Coleman &
Augustine L. Colarusso
BY
Sigmund Herzog
attorney.

United States Patent Office 2,784,245
Patented Mar. 5, 1957

2,784,245

STORAGE BATTERY SUPPORTS

Sidney Coleman, Maynard, and Augustine L. Colarusso, Boston, Mass., assignors to Van Brode Milling Co., Inc., Clinton, Mass., a corporation of Massachusetts Application December 27, 1955, Serial No. 555,434

7 Claims. (Cl. 136—166)

The present invention relates to the mounting or electric storage batteries in automotive vehicles, and more particularly to the provision of a receptacle which is adapted to be applied about a storage battery and in which electrolyte leaking or escaping from the battery will collect.

When electrolyte, such as a sulfuric acid solution, overflows from a battery, it runs downwardly along the side- or end-walls of the battery casing and finds its way to wires, the supporting tray, automobile frame and other elements that may be located under the battery, and is liable to short-circuit the battery and to cause corrosion of the other elements mentioned which are usually formed of iron or steel.

It has been proposed heretofore to provide a casing of acid-proof material, fitted about the battery, to catch the electrolyte which may be spilled from the battery, to prevent it from flowing to or contacting with the elements which may be disposed under the battery. The electrolyte collected in the casing had to be either manually drawn off the casing, or means had to be provided, such as a drain pipe, for causing the electrolyte to flow from the casing to a point below the elements which could be attacked by the same. Both of these methods are objectionable, the first-mentioned being cumbersome and usually resulting in flinging some of the electrolyte upon the motor vehicle elements mentioned above, as the liquid electrolyte is being removed from the casing, and in the second-mentioned method the acid solution issuing from the drain pipe is scattered onto the garage floor or generally on the ground.

The main object of the present invention is to obviate the difficulties above referred to by providing means whereby the sulfuric acid solution collected in the receptacle applied about the battery casing is chemically neutralized and caused to form a solid compound in said receptacle.

Another object of the invention is to provide a device of the character mentioned which is simple in construction, efficient in operation and which is capable of manufacture on a commercial scale or, in other words, one which is so simple to produce as not to be beyond the reasonable cost of such a contrivance.

One of the many possible embodiments of the invention is illustrated in the accompanying drawings, in which.

Figure 1:
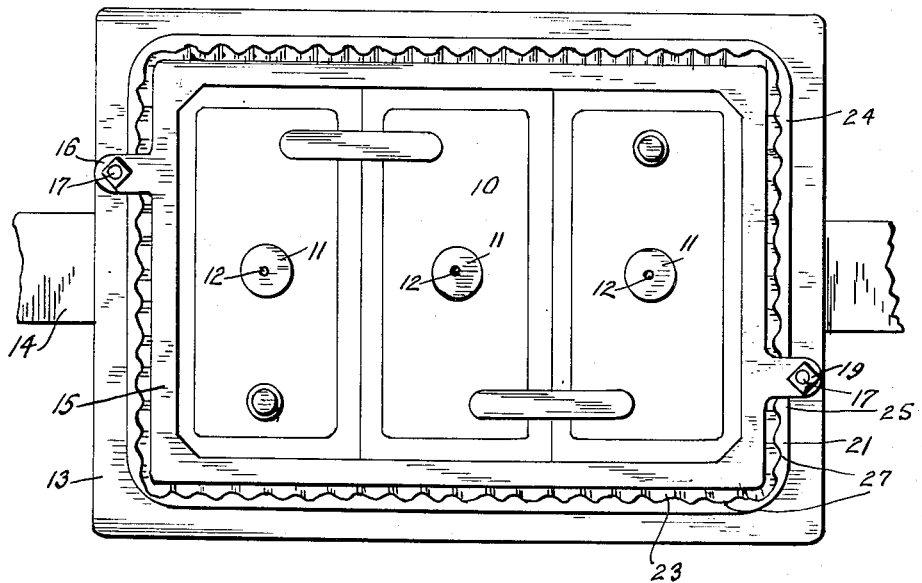
Figure 1 is a top plan view of a battery and its support, having the improved receptacle applied thereto.

In the drawings, the numeral 10 indicates a battery of conventional construction, provided with filler plugs 11, which are formed with openings 12 through which gas may issue from the battery cells, and from which electrolyte, in the instant case sulfuric acid solution, may escape from said cells either due to jolting of the battery or because of the expansion of said electrolyte. The battery, when installed in a motor vehicle, rests upon a support 13, which is welded or otherwise secured to a frame bar 14. The support 13 and frame bar 14 are formed of iron and steel, respectively. The battery is held upon the support by the usual hold-down frame 15, having lugs 16, projecting from opposite sides of said frame and through which bolts 17 are extended. The lower headed ends 18 of these bolts are fixed to the support 13, while their upper threaded ends project above the lugs 16 and are engaged by nuts 19, the latter bearing against the upper faces 20 of said lugs.

In order to prevent electrolyte escaping from the battery from reaching the metallic support 13, the frame bar 14 and any other elements located under the battery, an open receptacle 21 of acid-proof material is interposed between said support and the battery, said receptacle surrounding the battery in a manner hereinafter to be described. Any suitable material may be employed for the formation of the receptacle 21, but it is preferred to use polyethylene because, by its use, the receptacle is adapted to be produced by a simple molding or like operation. Polytheylene is not substantially affected at normal temperatures by even concentrated sulfuric acid, and is not attacked even at high temperatures, such as 212° F., by dilute sulfuric acid. It is thus especially suited for the purposes of the present invention.

The receptacle 21 is in the shape of a pan of generally rectangular form in order to be complementary to the shape and size of the battery. It includes a bottom 22, from which rise upwardly and outwardly extending side walls 23 and end walls 24, preferably provided at their upper, free ends with a downwardly bent skirt 25 which tends to strengthen the structure.

Figure 2:
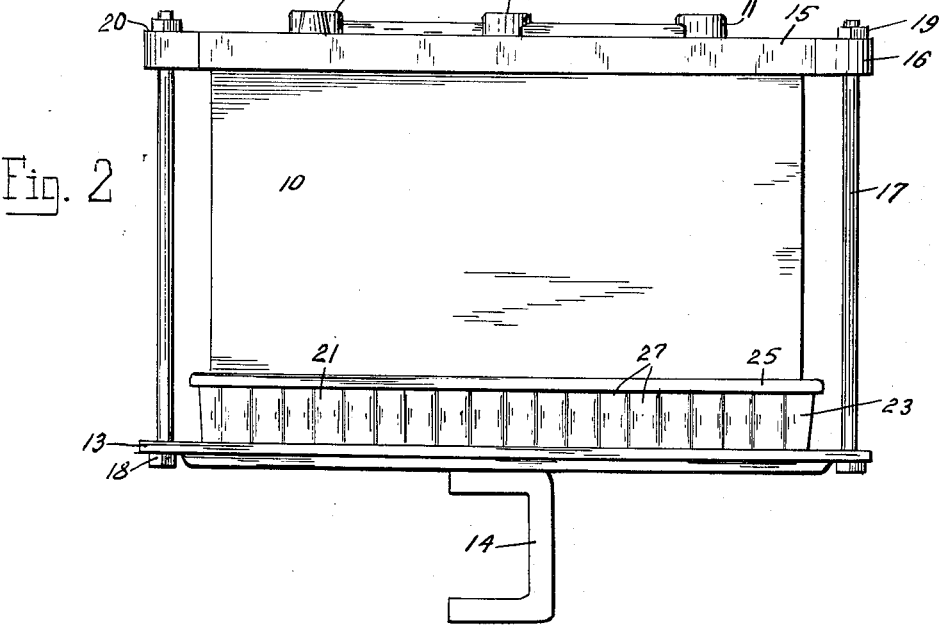
Figure 2 is a front elevation of the elements illustrated in Figure 1.
Figure 4:
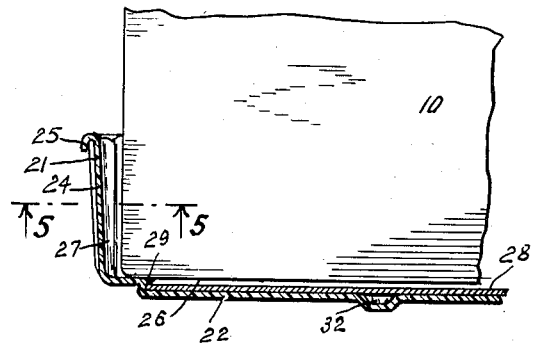
Figure 4 is a section taken on line 4—4 of Figure 3, on a larger scale.
Figure 5:
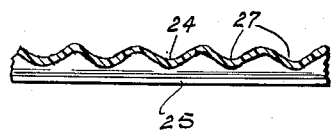
Figure 5 is a section taken on line 5—5 of Figure 4.

As appears from Figs. 2 and 4, the size of the pan bottom 22 is somewhat larger than that of the battery bottom 26, and the skirt 25 is located at a substantial distance from the walls of the battery, so that electrolyte running down along the side- and end-walls of the battery will find its way into said pan. The walls of the pan may be provided with downwardly running corrugations 27, to facilitate the flow of the electrolyte toward and onto the pan bottom 22.

Figure 3:
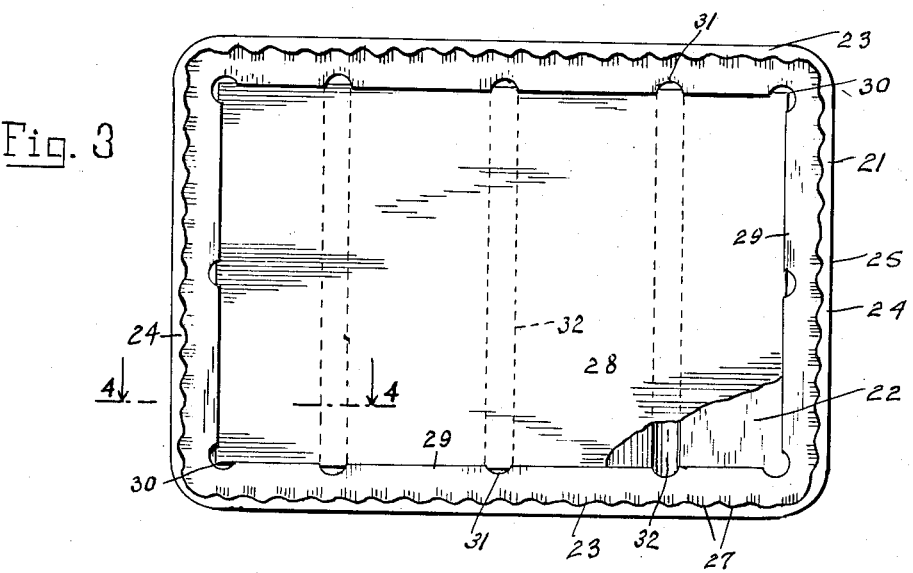
Figure 3 is a top plan view of the improved receptacle, a portion of one element being broken away more clearly to show the construction of one of the other elements.

Any suitable material may be placed and, preferably, fixed to the pan for chemically neutralizing the electrolyte and causing the same to form a compound. For this purpose it is preferred to employ magnesium, although, as will hereinafter appear, other materials may be used. The magnesium is employed in the form of a thin plate 28, held within the pan, in contact with the upper face of said bottom, for instance, by means of a flange 29, cast integral with and extending all around the lower inner faces of the side walls and end walls of the pan. As shown in Fig. 3, the corners 30 of the magnesium plate are spaced from said walls, to prevent injury to the latter in the event that the weight of the battery shifts said plate. The battery proper rests on the flange 29, so that the electrolyte collecting in the pan may find its way to the upper face of the magnesium plate through the arc-shaped recesses 31 in the flange 29, and through some of said recesses to channels 32 in the pan bottom 22, whence the liquid electrolyte may be brought into contact with the underface of said plate by the jolting of the vehicle.

When the electrolyte, sulfuric acid solution, comes into contact with the magnesium plate, a chemical reaction takes place, namely, magnesium sulfate is formed, the hydrogen of the sulfuric acid being freed. As the moisture evaporates, the magnesium sulfate stays on the body portion of the magnesium plate in the form of a white substance, which is of neutral character and is substantially fixed to said body portion. Any subsequent spill of the electrolyte will be neutralized and fixed in the pan as long as the magnesium plate lasts. Depending upon the size and thickness of the plate, it is expected that a single plate will outlast the normal life of a storage battery.

Obviously, other metals may be utilized in connection with the improved battery support herein described, namely, such metals which are adapted to replace the hydrogen of the sulfuric acid, although the rates of reaction may vary.

Substances, such as polished limestone, marble, which is a calcium carbonate, may be employed for the purpose of neutralizing the electrolyte. When the sulfuric acid solution reacts with this substance, calcium sulfate is formed, carbon dioxide being freed. The marble may be in the form of a slab, fixed to the pan bottom.

As another example, sodium carbonate may be mentioned. The sulfuric acid solution forms with this material sodium sulfate, carbon dioxide being given off.

As a still further illustration, reference may be made to suitable alkali powders, fused into slabs.

It is to be understood that the neutralizing materials herein disclosed all have the purpose of rendering harmless the otherwise dangerous sulfuric acid solution, and that other substances may be employed without departing from the invention, within the scope of the appended claims, or sacrificing any of its advantages.

What we claim is:

1. The combination with a storage battery employing an acid solution electrolyte, of a support including an open receptacle of acid-proof material applied about said battery, the walls of said receptacle being spaced from the walls of said battery, whereby electrolyte escaping from said battery is adapted to flow along the outer faces of the battery walls into said receptacle, and a solid material within said receptacle adapted to react chemically with said electrolyte for neutralizing the entire mass of the latter.

2. A combination according to claim 1, including means for fixing said neutralizing body to said receptacle.

3. A combination according to claim 1, wherein said neutralizing material comprises a body of magnesium.

4. A combination according to claim 3, wherein said magnesium body is fixed to said receptacle.

5. A support for a storage battery comprising a pan of acid-proof material, said pan being of generally rectangular form in order to be complementary to the shape and size of the battery and including a bottom, said bottom being somewhat larger than the battery bottom, upwardly and outwardly extending side walls and end walls, the upper free edges of which are spaced a substantial distance from the battery walls, whereby electrolyte escaping from the battery is adapted to flow along the outer surfaces of the battery walls into said pan, and an electrolyte neutralizing solid body in said pan.

6. A battery support according to claim 5, including means for fixing said body to said pan.

7. A battery support according to claim 5, wherein said neutralizing body is in the form of a plate member disposed above the bottom of said pan and forming a surface on which the battery is adapted to rest.

References Cited in the file of this patent
UNITED STATES PATENTS

| | | |
|---|---|---|
| 673,678 | Chamberlain et al. | May 7, 1901 |
| 2,621,221 | Munck | Dec. 9, 1952 |